United States Patent
Kumar et al.

(10) Patent No.: US 9,240,945 B2
(45) Date of Patent: Jan. 19, 2016

(54) ACCESS, PRIORITY AND BANDWIDTH MANAGEMENT BASED ON APPLICATION IDENTITY

(75) Inventors: Srinivas Kumar, Cupertino, CA (US); Vijayashree S. Bettadapura, Campbell, CA (US); Shadab Munam Shah, Sunnyvale, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 1289 days.

(21) Appl. No.: 12/406,613

(22) Filed: Mar. 18, 2009

(65) Prior Publication Data
US 2009/0241170 A1 Sep. 24, 2009

Related U.S. Application Data

(60) Provisional application No. 61/037,874, filed on Mar. 19, 2008.

(51) Int. Cl.
*G06F 15/16* (2006.01)
*H04L 12/801* (2013.01)
*H04L 12/833* (2013.01)
*H04L 29/06* (2006.01)

(52) U.S. Cl.
CPC ............ *H04L 47/10* (2013.01); *H04L 47/2458* (2013.01); *H04L 63/0227* (2013.01); *H04L 63/102* (2013.01)

(58) Field of Classification Search
USPC .......................................................... 726/4
See application file for complete search history.

(56) References Cited

U.S. PATENT DOCUMENTS

| | | |
|---|---|---|
| 5,218,637 A | 6/1993 | Angebaud et al. |
| 5,757,916 A | 5/1998 | MacDoran et al. |
| 5,784,562 A | 7/1998 | Diener |
| 5,867,494 A | 2/1999 | Krishnaswamy et al. |
| 5,887,065 A | 3/1999 | Audebert |
| 5,983,270 A | 11/1999 | Abraham et al. |
| 5,987,611 A | 11/1999 | Freund |

(Continued)

FOREIGN PATENT DOCUMENTS

| | | |
|---|---|---|
| CA | 2286534 | 4/2001 |
| EP | 1 071 256 | 1/2001 |

(Continued)

OTHER PUBLICATIONS

Aleksander Svelokken, "Biometric Authentication and Identification Using Keystroke Dynamics With Alert Levels", Master Thesis (Retrieved from University of Oslo), May 23, 2007, pp. 1-124.

(Continued)

*Primary Examiner* — William Goodchild
(74) *Attorney, Agent, or Firm* — Foley & Lardner LLP; Christopher J. McKenna; Paul M. H. Pua

(57) ABSTRACT

A method or system for managing packet flow is disclosed. The packets each include an inserted application identifier identifying a registered application. The method includes receiving packets destined for one or more resources, determining, by a packet processor, the inserted application identifier for each of the respective packets received and managing the packet flow of each received packet sent from a security node based at least in part on the inserted application identifier of the received packet.

20 Claims, 8 Drawing Sheets

(56) References Cited

U.S. PATENT DOCUMENTS

| | | | |
|---|---|---|---|
| 5,999,525 A | 12/1999 | Krishnaswamy et al. | |
| 6,021,495 A | 2/2000 | Jain et al. | |
| 6,070,245 A | 5/2000 | Murphy et al. | |
| 6,076,108 A | 6/2000 | Courts et al. | |
| 6,105,136 A | 8/2000 | Cromer et al. | |
| 6,141,758 A | 10/2000 | Benantar et al. | |
| 6,145,083 A | 11/2000 | Shaffer et al. | |
| 6,161,182 A | 12/2000 | Nadooshan | |
| 6,170,019 B1 | 1/2001 | Dresel et al. | |
| 6,199,113 B1 | 3/2001 | Alegre et al. | |
| 6,219,669 B1 | 4/2001 | Haff et al. | |
| 6,253,326 B1 | 6/2001 | Lincke et al. | |
| 6,304,969 B1 | 10/2001 | Wasserman et al. | |
| 6,335,927 B1 | 1/2002 | Elliott et al. | |
| 6,345,291 B2 | 2/2002 | Murphy et al. | |
| 6,393,569 B1 | 5/2002 | Orenshteyn | |
| 6,418,472 B1 | 7/2002 | Mi et al. | |
| 6,442,571 B1 | 8/2002 | Haff et al. | |
| 6,452,915 B1 | 9/2002 | Jorgensen | |
| 6,470,453 B1 | 10/2002 | Vilhuber | |
| 6,473,794 B1 | 10/2002 | Guheen et al. | |
| 6,480,967 B1 | 11/2002 | Jensen et al. | |
| 6,502,192 B1 | 12/2002 | Nguyen | |
| 6,510,350 B1 | 1/2003 | Steen et al. | |
| 6,519,571 B1 | 2/2003 | Guheen et al. | |
| 6,523,027 B1 | 2/2003 | Underwood | |
| 6,535,917 B1 | 3/2003 | Zamanzadeh et al. | |
| 6,536,037 B1 | 3/2003 | Guheen et al. | |
| 6,594,589 B1 | 7/2003 | Cixx, Jr. et al. | |
| 6,601,233 B1 | 7/2003 | Underwood | |
| 6,609,128 B1 | 8/2003 | Underwood | |
| 6,615,166 B1 | 9/2003 | Guheen et al. | |
| 6,633,878 B1 | 10/2003 | Underwood | |
| 6,640,248 B1 | 10/2003 | Jorgensen | |
| 6,704,873 B1 | 3/2004 | Underwood | |
| 6,718,535 B1 | 4/2004 | Underwood | |
| 6,721,713 B1 | 4/2004 | Guheen et al. | |
| 6,725,269 B1 | 4/2004 | Megiddo | |
| 6,731,625 B1 | 5/2004 | Eastep et al. | |
| 6,735,691 B1 | 5/2004 | Capps et al. | |
| 6,748,287 B1 | 6/2004 | Hagen et al. | |
| 6,754,181 B1 | 6/2004 | Elliott et al. | |
| 6,766,314 B2 | 7/2004 | Burnett | |
| 6,785,692 B2 | 8/2004 | Wolters et al. | |
| 6,826,616 B2 | 11/2004 | Larson et al. | |
| 6,839,759 B2 | 1/2005 | Larson et al. | |
| 6,850,252 B1 | 2/2005 | Hoffberg | |
| 6,856,330 B1 | 2/2005 | Chew et al. | |
| 6,870,921 B1 | 3/2005 | Elsey et al. | |
| 6,909,708 B1 | 6/2005 | Krishnaswamy et al. | |
| 6,944,279 B2 | 9/2005 | Elsey et al. | |
| 6,947,992 B1 | 9/2005 | Shachor | |
| 6,954,736 B2 | 10/2005 | Menninger et al. | |
| 6,957,186 B1 | 10/2005 | Guheen et al. | |
| 6,973,085 B1 * | 12/2005 | Acharya | 370/392 |
| 6,985,922 B1 | 1/2006 | Bashen et al. | |
| 7,013,290 B2 | 3/2006 | Ananian | |
| 7,039,606 B2 | 5/2006 | Hoffman et al. | |
| 7,054,837 B2 | 5/2006 | Hoffman et al. | |
| 7,072,843 B2 | 7/2006 | Menninger et al. | |
| 7,096,495 B1 | 8/2006 | Warrier et al. | |
| 7,100,195 B1 | 8/2006 | Underwood | |
| 7,107,285 B2 | 9/2006 | Von Kaenel et al. | |
| 7,120,596 B2 | 10/2006 | Hoffman et al. | |
| 7,145,898 B1 | 12/2006 | Elliott | |
| 7,149,698 B2 | 12/2006 | Guheen et al. | |
| 7,160,599 B2 | 1/2007 | Hartman | |
| 7,165,041 B1 | 1/2007 | Guheen et al. | |
| 7,171,379 B2 | 1/2007 | Menninger et al. | |
| 7,188,138 B1 | 3/2007 | Schneider | |
| 7,188,180 B2 | 3/2007 | Larson et al. | |
| 7,194,552 B1 | 3/2007 | Schneider | |
| 7,334,125 B1 | 2/2008 | Pellacuru | |
| 7,353,533 B2 | 4/2008 | Wright et al. | |
| 7,363,347 B2 | 4/2008 | Thomas | |
| 7,386,889 B2 * | 6/2008 | Shay | 726/26 |
| 7,398,552 B2 | 7/2008 | Pardee et al. | |
| 7,430,760 B2 | 9/2008 | Townsend et al. | |
| 7,509,687 B2 | 3/2009 | Ofek et al. | |
| 7,519,986 B2 | 4/2009 | Singhal | |
| 7,567,510 B2 | 7/2009 | Gai et al. | |
| 7,593,529 B1 | 9/2009 | Yang | |
| 7,596,803 B1 | 9/2009 | Barto et al. | |
| 7,637,147 B2 | 12/2009 | Lee et al. | |
| 7,644,434 B2 | 1/2010 | Pollutro et al. | |
| 7,660,902 B2 | 2/2010 | Graham et al. | |
| 7,660,980 B2 | 2/2010 | Shay et al. | |
| 7,770,223 B2 | 8/2010 | Shevenell et al. | |
| 7,877,601 B2 | 1/2011 | Smith et al. | |
| 7,978,700 B2 | 7/2011 | Kopelman et al. | |
| 8,412,838 B1 | 4/2013 | Wang et al. | |
| 8,910,241 B2 | 12/2014 | Pollutro et al. | |
| 2001/0020195 A1 | 9/2001 | Patel et al. | |
| 2001/0052012 A1 | 12/2001 | Rinne et al. | |
| 2001/0054044 A1 | 12/2001 | Liu et al. | |
| 2001/0054147 A1 | 12/2001 | Richards | |
| 2002/0002577 A1 | 1/2002 | Garg et al. | |
| 2002/0022969 A1 | 2/2002 | Berg et al. | |
| 2002/0029086 A1 | 3/2002 | Ogushi et al. | |
| 2002/0062367 A1 | 5/2002 | Debber et al. | |
| 2002/0077981 A1 | 6/2002 | Takatori et al. | |
| 2002/0078015 A1 | 6/2002 | Ponnekanti | |
| 2002/0080822 A1 | 6/2002 | Brown et al. | |
| 2002/0083183 A1 | 6/2002 | Pujare et al. | |
| 2002/0116643 A1 | 8/2002 | Raanan et al. | |
| 2002/0133723 A1 | 9/2002 | Tait | |
| 2002/0146026 A1 | 10/2002 | Unitt et al. | |
| 2002/0146129 A1 | 10/2002 | Kaplan | |
| 2002/0184224 A1 | 12/2002 | Haff et al. | |
| 2002/0193966 A1 | 12/2002 | Buote et al. | |
| 2003/0005118 A1 | 1/2003 | Williams | |
| 2003/0005300 A1 | 1/2003 | Noble et al. | |
| 2003/0009538 A1 | 1/2003 | Shah et al. | |
| 2003/0023726 A1 * | 1/2003 | Rice et al. | 709/225 |
| 2003/0033545 A1 | 2/2003 | Wenisch et al. | |
| 2003/0055962 A1 | 3/2003 | Freund et al. | |
| 2003/0063750 A1 | 4/2003 | Medvinsky et al. | |
| 2003/0083991 A1 | 5/2003 | Kikinis | |
| 2003/0084350 A1 | 5/2003 | Eibach et al. | |
| 2003/0171885 A1 | 9/2003 | Coss et al. | |
| 2003/0179900 A1 * | 9/2003 | Tian et al. | 382/100 |
| 2003/0200439 A1 | 10/2003 | Moskowitz | |
| 2003/0204421 A1 | 10/2003 | Houle et al. | |
| 2003/0208448 A1 | 11/2003 | Perry et al. | |
| 2003/0208562 A1 | 11/2003 | Hauck et al. | |
| 2003/0217126 A1 | 11/2003 | Polcha et al. | |
| 2003/0217166 A1 | 11/2003 | Dal Canto et al. | |
| 2003/0220768 A1 | 11/2003 | Perry et al. | |
| 2003/0220821 A1 | 11/2003 | Walter et al. | |
| 2004/0006710 A1 | 1/2004 | Pollutro et al. | |
| 2004/0022191 A1 * | 2/2004 | Bernet et al. | 370/230 |
| 2004/0024764 A1 | 2/2004 | Hsu et al. | |
| 2004/0031058 A1 | 2/2004 | Reisman | |
| 2004/0049515 A1 | 3/2004 | Haff et al. | |
| 2004/0107342 A1 | 6/2004 | Pham et al. | |
| 2004/0107360 A1 | 6/2004 | Herrmann et al. | |
| 2004/0111410 A1 | 6/2004 | Burgoon et al. | |
| 2004/0139313 A1 | 7/2004 | Buer et al. | |
| 2004/0142686 A1 | 7/2004 | Kirkup et al. | |
| 2004/0193606 A1 | 9/2004 | Arai et al. | |
| 2004/0193912 A1 | 9/2004 | Li et al. | |
| 2004/0214576 A1 | 10/2004 | Myers et al. | |
| 2004/0228362 A1 | 11/2004 | Maki et al. | |
| 2004/0230797 A1 | 11/2004 | Ofek et al. | |
| 2005/0010528 A1 * | 1/2005 | Pelz et al. | 705/51 |
| 2005/0015624 A1 | 1/2005 | Ginter et al. | |
| 2005/0027788 A1 | 2/2005 | Koopmans et al. | |
| 2005/0038779 A1 | 2/2005 | Fernandez et al. | |
| 2005/0132030 A1 | 6/2005 | Hopen et al. | |
| 2005/0185647 A1 | 8/2005 | Rao et al. | |
| 2005/0265351 A1 | 12/2005 | Smith et al. | |
| 2005/0283822 A1 | 12/2005 | Appleby et al. | |
| 2006/0005240 A1 | 1/2006 | Sundarrajan et al. | |
| 2006/0068755 A1 | 3/2006 | Shraim et al. | |

(56) References Cited

U.S. PATENT DOCUMENTS

| | | | |
|---|---|---|---|
| 2006/0075464 | A1 | 4/2006 | Golan et al. |
| 2006/0080441 | A1 | 4/2006 | Chen et al. |
| 2006/0080667 | A1 | 4/2006 | Sanghvi et al. |
| 2006/0090196 | A1 | 4/2006 | Van Bemmel et al. |
| 2006/0198394 | A1 | 9/2006 | Gotoh et al. |
| 2006/0218273 | A1 | 9/2006 | Melvin |
| 2006/0245414 | A1 | 11/2006 | Susai et al. |
| 2006/0248480 | A1 | 11/2006 | Faraday et al. |
| 2006/0248580 | A1 | 11/2006 | Fulp et al. |
| 2006/0253900 | A1 | 11/2006 | Paddon et al. |
| 2006/0271652 | A1 | 11/2006 | Stavrakos et al. |
| 2006/0274774 | A1 | 12/2006 | Srinivasan et al. |
| 2006/0277275 | A1 | 12/2006 | Glaenzer |
| 2006/0277591 | A1 | 12/2006 | Arnold et al. |
| 2006/0282545 | A1 | 12/2006 | Arwe et al. |
| 2006/0282876 | A1 | 12/2006 | Shelest et al. |
| 2007/0008978 | A1* | 1/2007 | Pirzada et al. ......... 370/395.43 |
| 2007/0038618 | A1 | 2/2007 | Kosciusko et al. |
| 2007/0061434 | A1* | 3/2007 | Schmieder et al. ......... 709/223 |
| 2007/0101154 | A1* | 5/2007 | Bardsley et al. ......... 713/186 |
| 2007/0113269 | A1 | 5/2007 | Zhang |
| 2007/0136317 | A1 | 6/2007 | Przywara |
| 2007/0192853 | A1 | 8/2007 | Shraim et al. |
| 2007/0271592 | A1 | 11/2007 | Noda et al. |
| 2007/0283014 | A1 | 12/2007 | Shinomiya et al. |
| 2007/0294762 | A1 | 12/2007 | Shraim et al. |
| 2007/0299915 | A1 | 12/2007 | Shraim et al. |
| 2008/0005779 | A1 | 1/2008 | Takenaka et al. |
| 2008/0008202 | A1 | 1/2008 | Terrell et al. |
| 2008/0098129 | A1 | 4/2008 | Niddam et al. |
| 2008/0215889 | A1* | 9/2008 | Celik et al. ......... 713/176 |
| 2008/0228932 | A1 | 9/2008 | Monette et al. |
| 2009/0158384 | A1* | 6/2009 | Kanade et al. ......... 726/1 |
| 2009/0210364 | A1 | 8/2009 | Adi et al. |
| 2010/0037284 | A1* | 2/2010 | Sachs ......... 726/1 |
| 2010/0223222 | A1 | 9/2010 | Zhou et al. |
| 2010/0235879 | A1 | 9/2010 | Burnside et al. |
| 2011/0280215 | A1 | 11/2011 | Nakagawa et al. |
| 2012/0051529 | A1 | 3/2012 | Dobbins et al. |
| 2012/0096513 | A1 | 4/2012 | Raleigh et al. |
| 2012/0304277 | A1 | 11/2012 | Li et al. |

FOREIGN PATENT DOCUMENTS

| | | |
|---|---|---|
| EP | 1 418 730 | 5/2004 |
| EP | 1 641 215 | 3/2006 |
| JP | 06-097905 | 4/1994 |
| JP | 11-205388 | 7/1999 |
| JP | 2001-306521 | 11/2001 |
| JP | 2003-008651 | 1/2003 |
| WO | WO-01/33759 | 5/2001 |
| WO | WO-01/38995 | 5/2001 |
| WO | WO-02/079949 | 10/2002 |
| WO | WO 2005/066737 A1 * | 7/2005 |

OTHER PUBLICATIONS

Darryle Merlette, Dr. Parag Pruthi; Network Security; NetDetector: Identifying Real Threats and Securing Your Network; Copyright © 2003 Niksun, Inc., Monmouth Junction NJ, USA.

Darryle Merlette; Spencer Parker, Dr. Parag Pruthi; Niksun Network Security; NetDetector: Monitoring and Minimizing Instant Messaging Risks; Copyright @ 2003 Niksun, Inc., Monmouth Junction NJ, USA.

Scarfone et ai, Guide to Intrusion Detection and Prevention Systems (IOPS), Feb. 2007, NIST, Special Publication 800-94.

Office Action for U.S. Appl. No. 10/423,444 dated Sep. 7, 2007.
Office Action for U.S. Appl. No. 10/423,444 dated Jun. 13, 2006.
Office Action for U.S. Appl. No. 10/423,444 dated Mar. 12, 2007.
Office Action for U.S. Appl. No. 10/423,444 dated Mar. 14, 2008.
Office Action for U.S. Appl. No. 10/423,444 dated Sep. 19, 2008.
Office Action for U.S. Appl. No. 10/423,444 dated Dec. 2, 2008.
Office Action for U.S. Appl. No. 10/423,444 dated Feb. 25, 2009.
Office Action for U.S. Appl. No. 10/423,444 dated Jul. 27, 2009.
Notice of Allowance for U.S. Appl. No. 10/423,444 dated Nov. 16, 2009.
Office Action for U.S. Appl. No. 12/163,292 dated Feb. 2, 2011.
Office Action for U.S. Appl. No. 12/163,292 dated Aug. 8, 2011.
Office Action for JP Application No. 2006-547397 dated Nov. 30, 2010.
Office Action for JP Application No. 2006-547397 dated Jul. 5, 2011.
Office Action for U.S. Appl. No. 10/583,578 dated Jun. 24, 2010.
Office Action for U.S. Appl. No. 10/583,578 dated Feb. 11, 2011.
Office Action for U.S. Appl. No. 10/583,578 dated Jul. 19, 2011.
Office Action for U.S. Appl. No. 12/270,278 dated Jun. 24, 2011.
Office Action for U.S. Appl. No. 12/270,278 dated Nov. 9, 2011.
Office Action for U.S. Appl. No. 12/267,804 dated Aug. 16, 2011.
Office Action for U.S. Appl. No. 12/267804 dated Apr. 25, 2011.
Office Action for U.S. Appl. No. 12/406,613 dated Oct. 24, 2011.
Written Opinion of the International Search Authority for PCT Application No. PCT/US2004/043405; Completed Mar. 15, 2005; Mailed Mar. 23, 2005.
International Search Report for International Application No. PCT/US2004/043405; Completed Mar. 15, 2005; Mailed Mar. 23, 2005.
International Search Report for International Application No. PCT/US2008/007984; Completed Aug. 22, 2009; Mailed Sep. 3, 2009.
Notice of Allowance on U.S Appl. No. 10/583,578 dated Mar. 27, 2012.
Office Action on U.S. Appl. No. 12/267,804 dated Apr. 10, 2012.
Office Action for U.S. Appl. No. 12/267,850 dated Nov. 7, 2012.
Office Action for U.S. Appl. No. 12/267,850 dated Jun. 14, 2012.
Office Action for U.S. Appl. No. 12/432,186 dated Jun. 25, 2012.
US Notice of Allowance for U.S. Appl. No. 12/163,292 dated Aug. 6, 2014.
US Notice of Allowance for U.S. Appl. No. 12/267,804 dated Apr. 24, 2013.
US Office Action for U.S. Appl. No. 12/270,278 dated Feb. 20, 2014.
US Office Action for U.S. Appl. No. 12/163,292 dated Apr. 25, 2014.
US Office Action for U.S. Appl. No. 12/267,804 dated Sep. 27, 2012.
US Office Action for U.S. Appl. No. 12/267,850 dated Mar. 26, 2013.
US Office Action for U.S. Appl. No. 12/267,850 dated Sep. 30, 2013.
US Office Action for U.S. Appl. No. 12/270,278 dated Aug. 15, 2014.
US Office Action for U.S. Appl. No. 12/432,186 dated Feb. 21, 2013.
US Notice of Allowance for U.S. Appl. No. 12/270,278 dated Nov. 14, 2014.
US Notice of Allowance for U.S. Appl. No. 12/267,850 dated Nov. 6, 2014.
US Notice of Allowance for U.S. Appl. No. 12/432,186 dated Sep. 10, 2014.
US Office Action on U.S. Appl. No. 14/563,904 DTD Jun. 22, 2015.

* cited by examiner

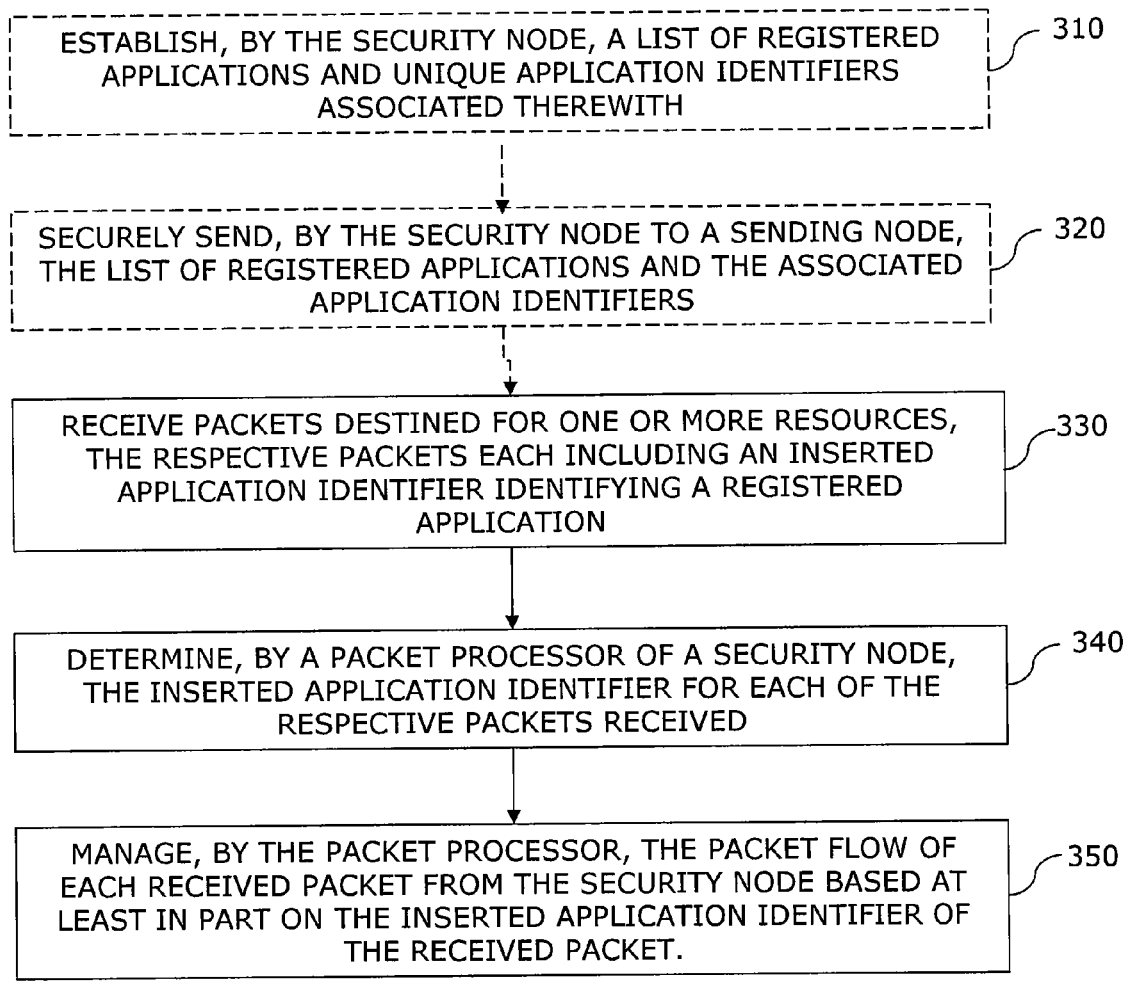

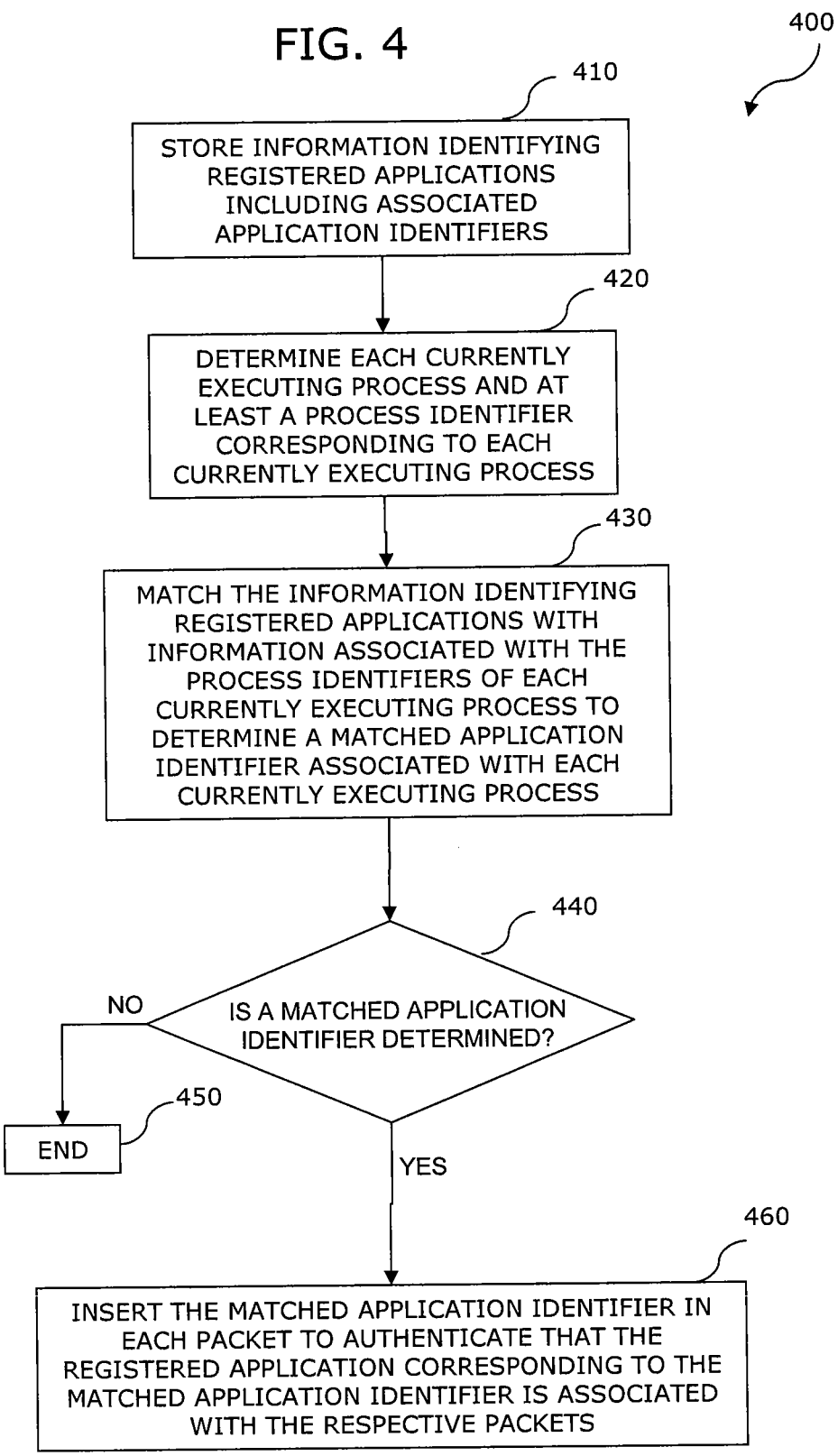

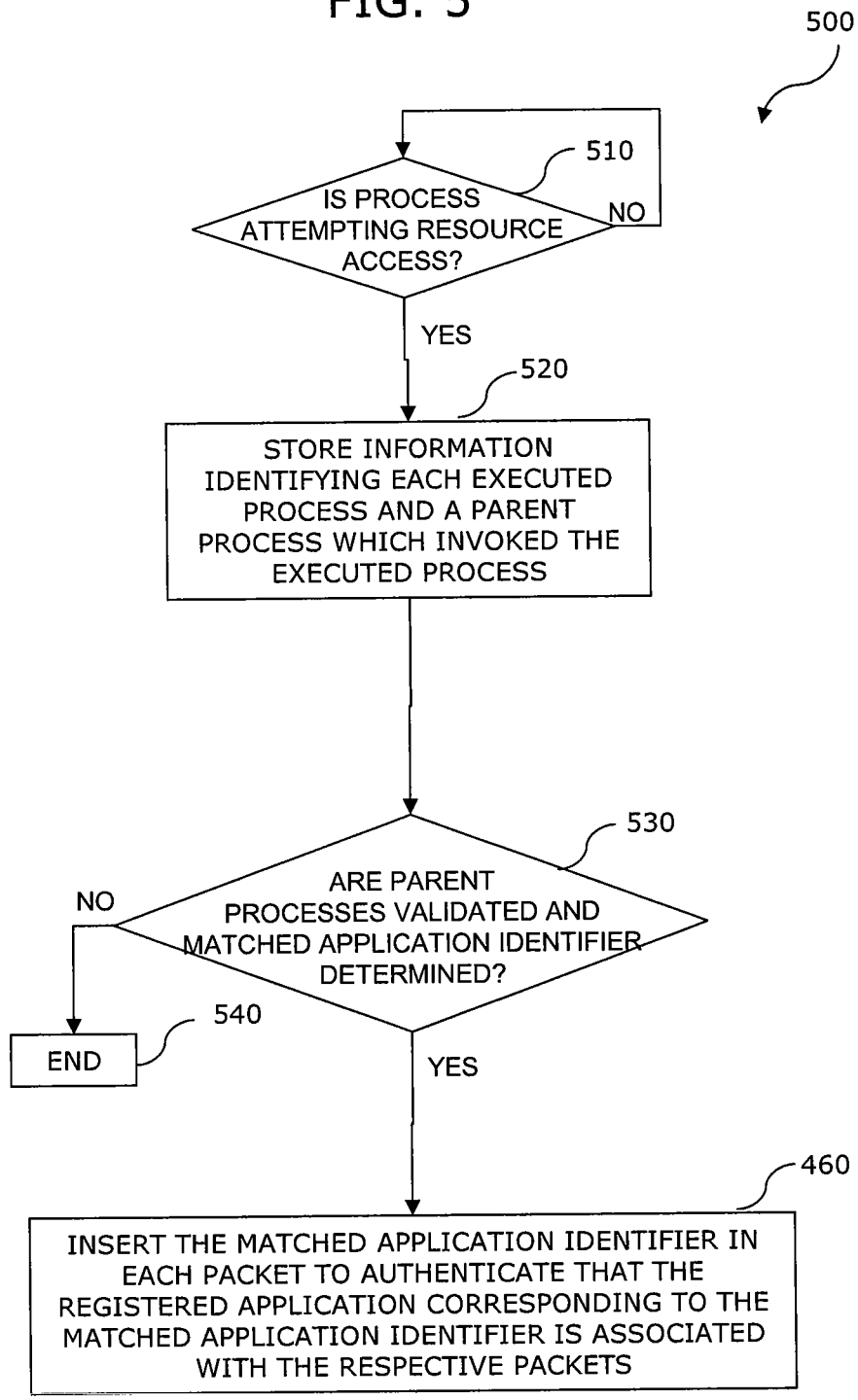

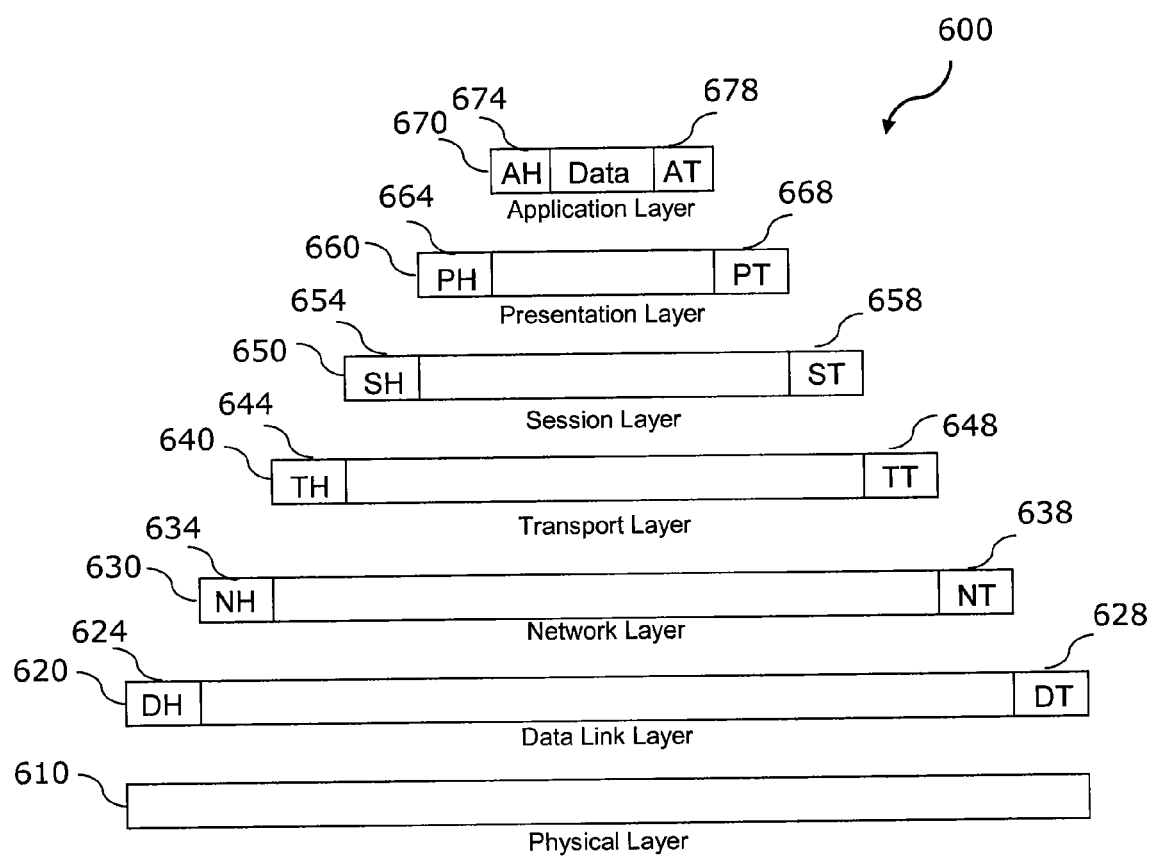

ACCESS, PRIORITY AND BANDWIDTH MANAGEMENT BASED ON APPLICATION IDENTITY

CROSS REFERENCE TO RELATED APPLICATIONS

This application claims the benefit of U.S. Provisional Application No. 61/037,874, filed Mar. 19, 2008, entitled "Access, Priority and Bandwidth Management Based On Application Identity" the contents of which are hereby incorporated by reference.

BACKGROUND OF THE INVENTION

Computer system resources such as web servers and database services may be directly accessible through networks such as LANs, WANs, and the Internet. Communication between computer systems over a network typically takes place through transmitted data structures called packets. A packet may include data being transported from one system to another system. Such data is generally referred to as payload. A packet may also include other data that defines the structure and nature of the packet, and information indicating the origin and destination of the packet and information indicating other packet characteristics such as information in network and transport layer headers. A stream of packets may constitute a communication from one system to another system.

SUMMARY OF THE INVENTION

The invention is embodied as a method and a system for managing packet flow. Respective packets each may include an inserted application identifier identifying a registered application. The method may include receiving packets destined for one or more resources. The method may further include a packet processor of a security node determining the inserted application identifier for each of the respective packets received and managing the packet flow of each received packet sent from the security node based at least in part on the inserted application identifier of the received packet.

The invention also is embodied as a method and a system for inserting an application identifier into respective packets sent from a sending node destined for a resource on a network. The method may include an electronic database of the sending node storing information identifying registered applications including associated application identifiers and a program processor of the sending node determining each currently executing process and at least a process identifier corresponding to each currently executing process. The method may also include the information identifying registered applications being matched with information associated with the process identifiers of each currently executing process using the electronic database to determine a matched application identifier associated with each currently executing process. The method may further include the program processor inserting the matched application identifier in each packet to authenticate that the registered application corresponding to the matched application identifier is associated with the respective packets.

The invention further is embodied as a security node for managing packet flow between a sending node and one or more resources on a network. The security node may include a registration unit for registering applications that are authorized to access the one or more resources on the network and a packet processor for determining an application identifier and a user identifier inserted in each received packet and for managing the packet flow of each received packet based at least in part on the application and user identifiers inserted in each received packet.

The invention is additionally embodied as a sending node for managing packet flow to one or more resources on a network. The sending node includes an electronic database for storing information identifying registered applications including associated application identifiers, a program processor for determining each currently executing process and at least a process identifier corresponding to each currently executing process, and a sending unit for sending each packet destined for the one or more resources. The information identifying registered applications is matched with information associated with the process identifiers of each currently executing process to determine a matched application identifier associated with each currently executing process. The program processor inserts the matched application identifier in each packet to authenticate that the registered application corresponding to the matched application identifier is associated with the respective packets.

BRIEF DESCRIPTION OF THE DRAWINGS

The invention is best understood from the following detailed description when read in connection with the accompanying drawings. According to common practice, various features/elements of the drawings may not be drawn to scale. Common numerical references represent like features/elements. The following figures are included in the drawings:

FIG. 3 is a flow chart illustrating a method of managing packet flow in accordance with yet another exemplary embodiment of the invention;

FIG. 4 is a flow chart illustrating a method of inserting an application identifier into respective packets from a sending node destined for a resource on a network in accordance with yet another exemplary embodiment of the invention;

FIG. 5 is a flow chart illustrating a method of inserting an application identifier into respective packets in accordance with yet another exemplary embodiment of the invention; and FIG. 6 is an exemplary packet schema illustrating a position of a security tag in accordance with yet another exemplary embodiment of the invention.

DETAILED DESCRIPTION OF THE INVENTION

Figure 1A:
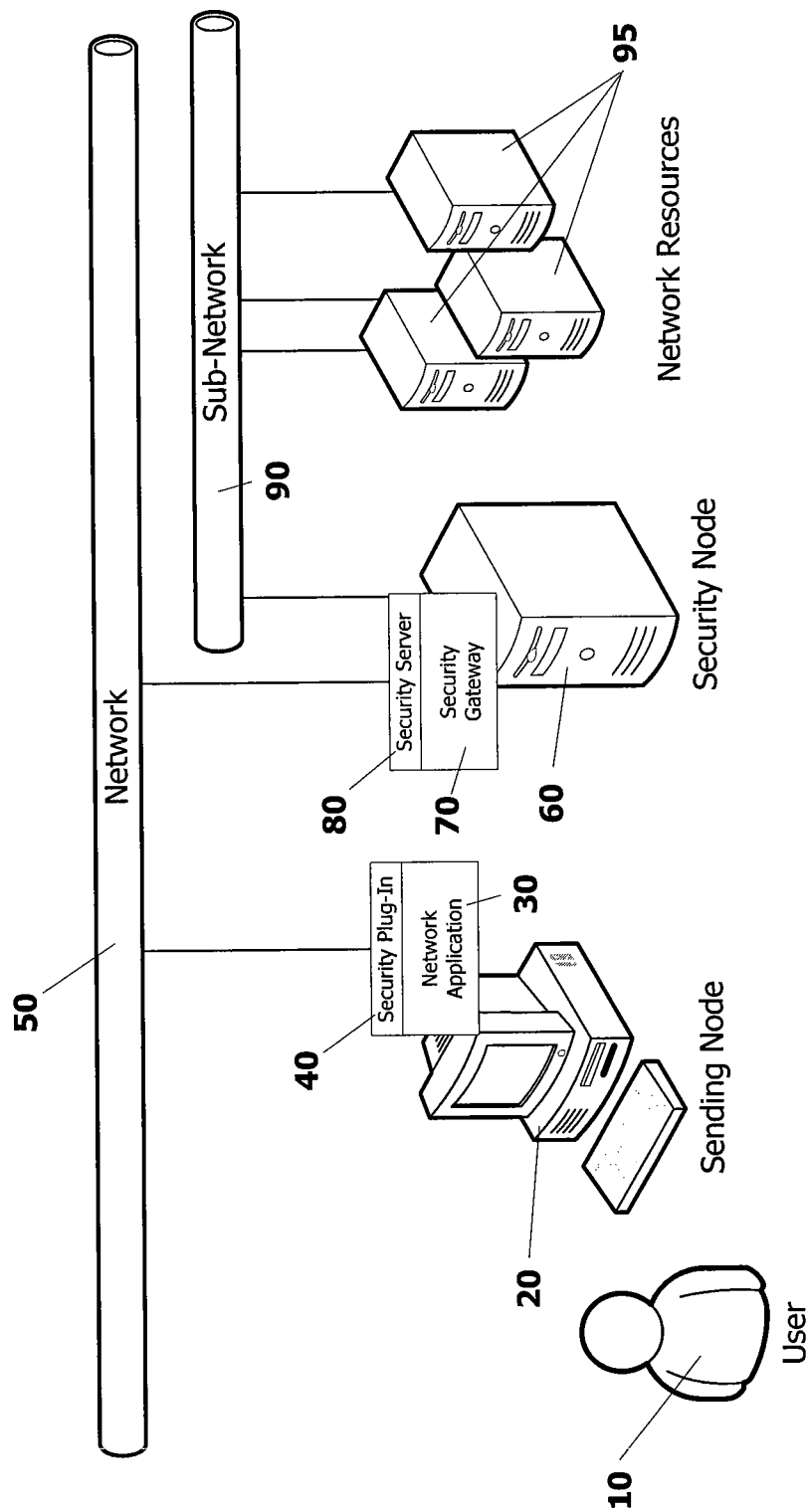
FIG. 1A is a diagram illustrating a network using secure communications in accordance with an exemplary embodiment of the invention.

Access control of packets in a communication based exclusively on conventional network and transport layer headers may be inadequate to ensure security from malicious applications, trojans, worms, malware, spyware and other forms of rogue programs. Currently, network based application recognition technology relies on complex deep packet inspection technologies to analyze data streams above the network layer, which use, for example, application protocol level statefulness, packet defragmentation at the network layer, message reassembly at the transport layer and heuristic rules. Application recognition may infer (may make a best guess at) the source application generating a packet in a communication by inspecting, for example, the protocols used within the packet. The emergence of new application layer protocols, payload encryption or encoding, and the demand for higher throughput and lower latencies for communications may pose challenges to scale and sustain such technologies within core enterprise networks. Application recognition, which relies on protocol recognition, may allow a rogue program to maliciously trespass on a communication by mimicking an application protocol used in the communication. For example, a rogue application may be able to mimic a SQL or POP3 client to gain access to an SQL or Mail server. Because the payload of the packets in the communication may be encrypted or encoded, mid-stream deep packet inspection may be rendered ineffective at stopping the malicious trespass.

As used herein, application watermarking refers to watermarking of a source application that is running on a sending node after a user has logged in and has been authenticated. Application watermarking at the packet level may provide a viable and scalable alternative to application recognition and access controls derived from non-repudiable application identity. Application watermarking (e.g., fingerprinting or marking) at the sending node may simplify verification and validation of application level privileges and access policies and may enable granting or blocking (preventing) access at any policy enforcement point (PEP) along the flow based on security rules (or policies).

Access management, auditing, bandwidth management and packet marking for quality of service, among others may be performed with relative ease using application watermarking using in-band meta-data tags to overcome the challenges posed by application recognition technologies. For example, computer security systems may prevent trespasses by authenticating users and/or applications that desire to use resources and then, watermarking packets in a communication to ensure that the communication between authenticated users/applications and resources are not taken over by outside entities intent on malicious trespass.

Methods for maintaining secure communications via packets may include insert a security tag into each packet. The security tag may include information that the sender and receiver may verify. This ensures to the receiver that the packet is from a known (verified) sender and/or that the application is a registered (known) application. For example, a validated security tag may ensure that the corresponding packet is from a particular sender and is not from an outside source that is attempting to break into the associated packet stream. In addition, the security tag may ensure that the payload of such a packet has not been altered during transmission.

FIG. 1A is a diagram illustrating an exemplary network (environment) for secure communications in accordance with an exemplary embodiment of the invention.

Referring to FIG. 1A, a user 10 may operate a sending node 20, which may be a personal computer or other computing device. Sending node 20 may have an operating system (OS) or network application 30 for execution thereon that allows sending node 20 to communicate via a network 50 with other devices.

In certain exemplary embodiments, a security plug-in 40 that may run within OS 30 may examine (analyze) and/or may modify packets sent by sending node 20. Security plug-in 40 may be an application program, may be another program or may be a hardware module executing on sending node 20.

In certain exemplary embodiments, security plug-in may insert a security tag into a portion or all of the packets sent by sending node 20.

A security node 60 may be a gateway device to a sub-network 90 of network 50 that may connect to one or more network resources 95, such as web servers, database servers, and/or other services that user 10 may desire to access. A security gateway 70 (e.g., a program or a hardware module) may run on security node 60. A security server 80 may run as part of security gateway 70 to examine and/or modify incoming packets and may communicate with sending node 20 via sub-network 90 and/or network 50.

Although security plug-in 40 and security server 80 are illustrated in the network application and security gateway, respectively, security plug-in 40 and security server 80 may be provided in any device on the network or sub-network that interacts with the stream of packets being secured.

Although security node 60 is illustrated as a gateway device, it is contemplated that the operations of security node 20 may be included in a router device, a bridge device or a virtualized (hypervisor) platform.

Figure 1B:
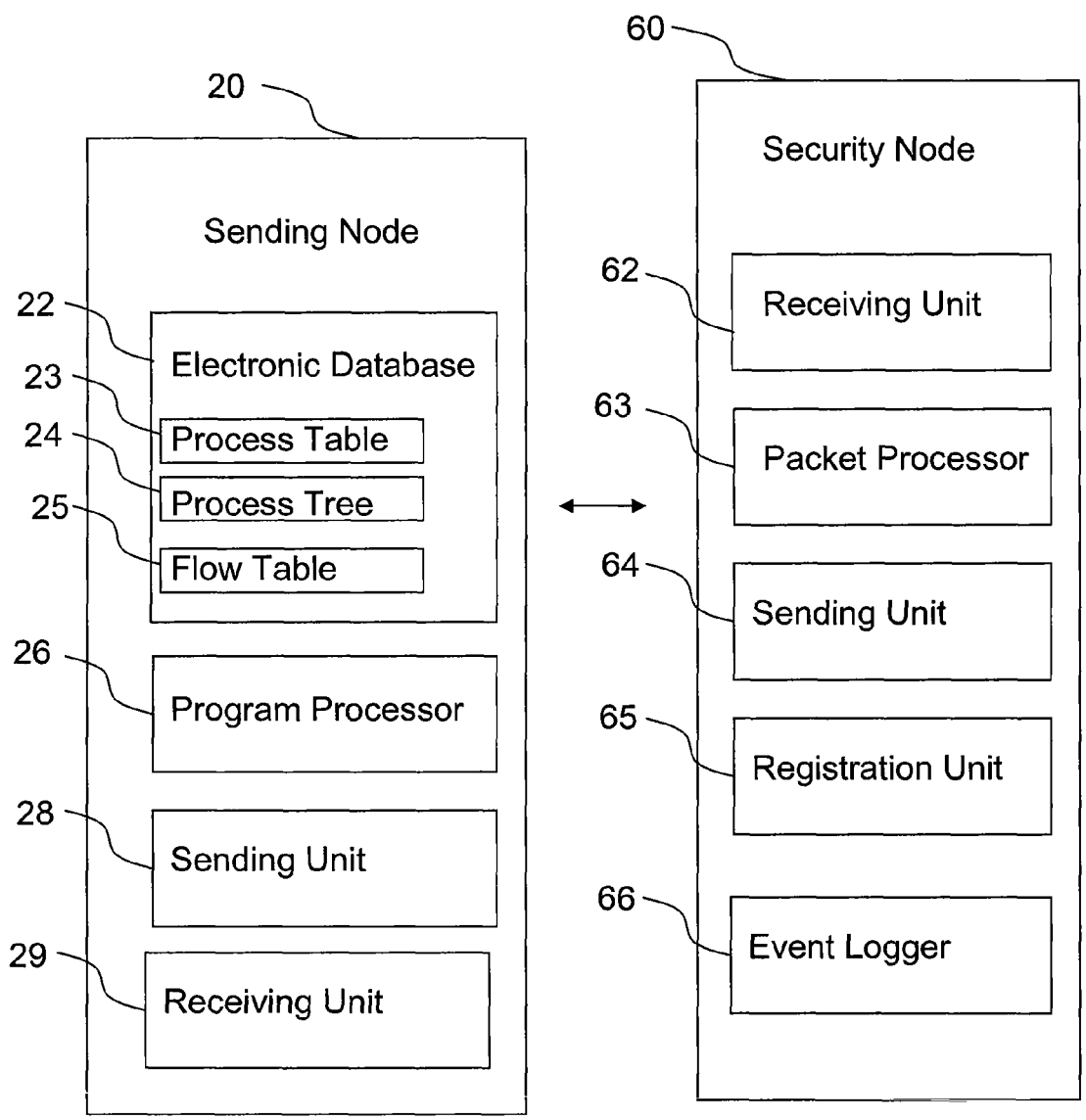
FIG. 1B is a diagram illustrating sending and security nodes of FIG. 1A.

FIG. 1B is a diagram illustrating sending and security nodes 20 and 60 of FIG. 1A.

Referring to FIG. 1B, sending node 20 may include: (1) an electronic database 22; (2) a program processor 26; (3) a sending unit 28; and (4) a receiving unit 29. Electronic database 22 may store a process table 23, process tree 24 and/or a flow table 25. Process table 23 may include information (records) identifying: (1) currently executing processes; (2) their associated image names; and (3) their associated registered applications executing on sending node 20, as associated application identifier, among others.

Flow table 25 may store information (records) identifying each packet flow (e.g., a currently executing packet flow) associated with a particular registered application (e.g., an application identifier). Each record in flow table 25 may include a flow identifier, for example, indexed to (associated with) a particular application identifier (e.g., that is associated with a currently executing process validated as matched to a registered application). For example, a plurality of source applications may be executing on sending node 20 and each may be accessing network 50 (e.g., creating a packet flow on network 50). Each packet flow may be identified by a flow identifier and associated with an application identifier in flow table 25 such that flow table maintains a record of each currently executing packet flow (e.g., to maintain statefulness of each packet flow).

Process tree 24 may store a tree structure (or a set of linked lists) of process identifiers such that process identifiers associated with parent processes are linked to process identifiers associated with child processes. Process tree 24 may be used to validate that each of the associated parent processes in a sequence of parent processes, such as grandparent and great grandparent processes, of a currently executing process are also associated with registered applications. This validation process will be described below.

Process table 23 of electronic database 22 may be used to match the information identifying registered applications stored or temporarily cached, for example, in application profile 250 (see FIG. 2A) with information associated with the process identifiers of each currently executing process. For example, a policy administrator may select a gold-master copy of an executable (for example, residing securely anywhere on an enterprise network) and may allow access for copies (e.g., identical copies) of this executable to particular resources by generate a list (i.e. a white-list) of registered executable/applications and their associated authorized resources. The policy administrator may identify the registered applications to determine which of the register applications are authorized to access particular resources 95.

The information identifying a respective registered application may include, for example: (1) an application name; (2) a digital digest (hash value) of the gold-master copy of the executable; (3) a file date and time associated with the gold master copy of the executable; (4) a version associated with the gold master copy of the executable; (5) a size of the gold-master copy of the executable; (6) publication information associated with the gold-master copy of the executable and/or (7) an application identifier associated with the gold-master copy of the executable, among others. This information may be securely stored as an application profile in a centralized repository accessible to security node 60. A globally unique application identifier (AID) may be assigned to each configured registered application and application profiles may be downloaded by the security node during user authentication.

The information identifying a respective currently executing process may be matched to the information identifying the registered application, and may include, for example, the operating system (OS) process identifiers, application executable image loaded into the process space from a storage media, executable file date and file time markers and/or the file digest (hash value) of the executable file invoking the process, among others.

In certain exemplary embodiments, the matching of the application identifier and/or the validation of the parent processes may be responsive to the currently executing process being invoked or based on a resync signal/command being issued. For example, a resync signal/command may be issued (1) periodically; (2) after a predetermined number of packets are sent by sending node 20; and/or (3) based on a signal/command from security node 60, among others.

Program processor 26 may determine each currently executing process and at least a process identifier corresponding to each currently executing process and may insert a matched application identifier in each packet. By inserting the matched application identifier in each packet, sending node 20 authenticates to security node 60 that the registered application corresponding to the matched application identifier is associated with the respective packets. As used herein, a matched application identifier refers to an identifier associated with a registered application that is registered in security node 60.

Sending unit 28 may send the packets destined for resources external to sending node 20 (e.g., the one or more resources 95, see FIG. 1A) via, for example, security node 60. Receiving unit 29 may receive packets from resources external to sending node 20 (including security node 60). Receiving unit 29 may receive messages or commands from security node 60 including, for example, resync signals/commands or registered application information, among others. For example, after a user session is established, a white-list of application profiles may be dynamically refreshed, using such a command with a modified application profile and/or a different set of application identifiers sent from security node 60.

In certain exemplary embodiments, communications between receiving unit 29 and security node 60 may be encrypted, a security tag inserted into each packet sent from receiving unit 29 may be encrypted, certain fields within the security tag may be encrypted and/or certain fields within the security tag may be obfuscated (e.g., changed or scrambled to make the data in those fields non-obvious to a malicious trespasser).

Security node 60 may manage packet flow between sending node 20 and one or more resources 95 on network 50 (and/or sub-network 90). Security node 60 may include: (1) a receiving unit 62; (2) a packet processor 63; (3) a sending unit 64; (4) a registration unit 65 and/or (5) an event logger 66. Receiving and sending units 62 and 64 function substantially the same as receiving and sending units 28 and 29 of sending node 20 to communicate with devices/nodes external to security node 60.

In various exemplary embodiments, packets sent from sending node 64 may include only an application identifier associated with a registered application. Alternatively, such packets may include: (1) an application identifier and user identifier; or (3) an application identifier, user identifier and other security information embedded in a security tag, among other possible data schema.

Packet processor 63 may determine the application identifier and/or the user identifier inserted in each received packet, and may manage packet flow of each received packet based at least in part on the inserted application identifier and/or the inserted user identifier in each received packet.

Security node 60 may receive from a policy server (not shown) or have stored internally a set of security rules (policies) for managing the packet flow from security node 60. Packet processor 63 may scan for embedded security tag or security information (e.g., a user identifier and/or an application identifier) in each of the packets received by security node 60 and may extract the inserted security tag or security information from the received packets.

In certain exemplary embodiments, packet processor 63 may reassemble the packets without the security tag or security information. Packet processor 63 may manage packet flow sent from security node 60 by: determining, for each received packet, whether a user associated with the inserted user identifier is authorized to use a specific application or a specific resource based on the set of security rules. If the user is authorized to use the specific application and the specific resource, security node 60 may determine at least one of a priority or a bandwidth for flow of the respective packets to the specific resource. This determination of the priority or the bandwidth may be based on at least the application identifier and the user identifier inserted in the packets received by security node 60. If the user is non-authorized to use the specific application or the specific resource, security node 60 may block (prevent) the packet flow associated with the non-authorized user to the packet destination (one or more of resources 95, for example). Such blocking is based on security rules setup, for example, by the policy administrator.

Registration unit 65 may register applications that are authorized to access one or more resources 95 on network 50. During user authentication, the white-list of application profiles may be securely dispatched (via encryption using a negotiated session key) from registration unit 65 via sending unit 62 to sending node 20 based on application privileges provisioned by the security rules (e.g., the policies) for a specific user. Security node 60 may also issue a session key to sending node 20 to enable decryption of the white-list of application profiles. The session key may be periodically changed using a secure communication channel between sending node 20 and security node 60. The changing of the session key may not impact already established transactions.

Event logger 66 may generate audit logs from packets received by security node 60. Such packets may include at least information to watermark an application associated with the received packets. For example, security node 60 may identify for each packet, a particular application identify corresponding to a registered application invoked by the user to access a resource, a particular user identifier, and other information to identify an origin and a destination of the packet. The information may be stored as audit information in audit logs on an ongoing basis or when an exception to a security policy occurs. Events logged by the security node 60 may be sent to an audit server (or other SYSLOG) for archival, compliance reports and other audit purposes to provide an audit trail for compliance with non-repudiable application information.

Figure 2A:
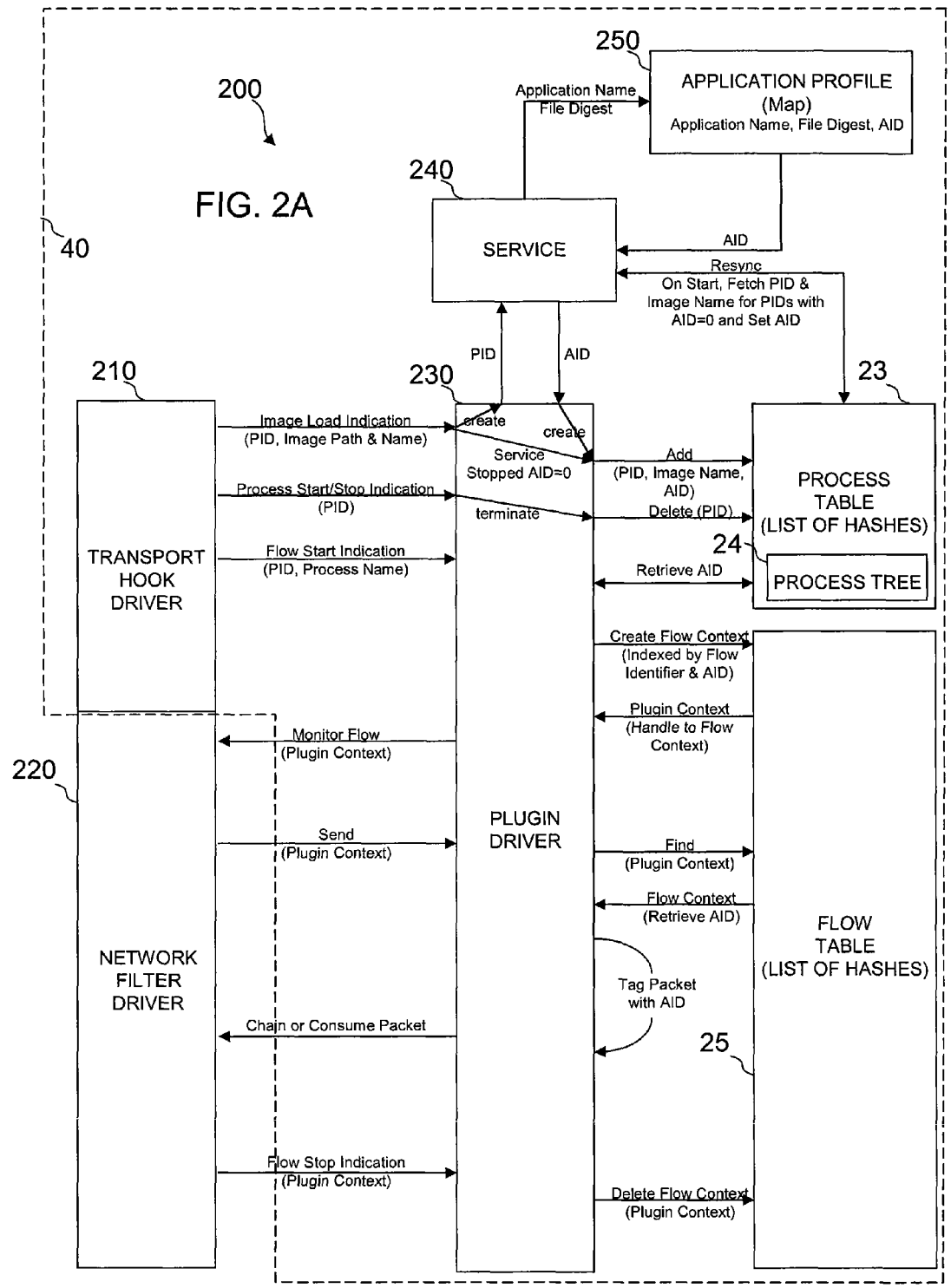
FIG. 2A is a schema illustrating an exemplary data processing method in accordance with another exemplary embodiment of the invention.
Figure 2B:
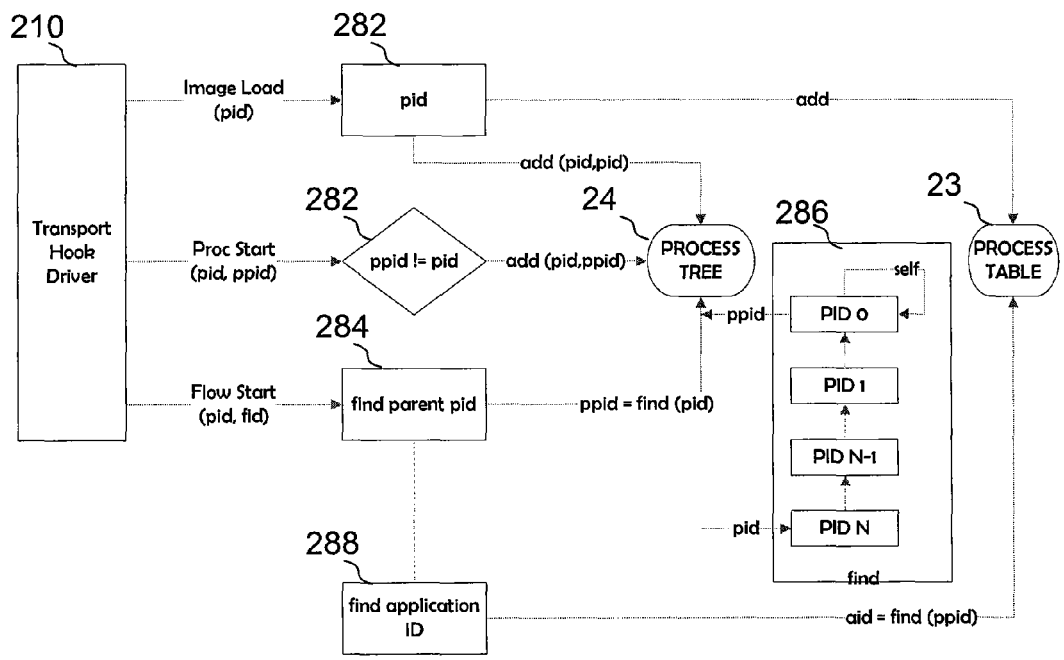
FIG. 2B is a schema illustrating a portion of the exemplary data processing method 200.

FIG. 2A is a schema illustrating an exemplary data processing method in accordance with another exemplary embodiment of the invention. FIG. 2B is a schema illustrating a portion of exemplary data processing method 200.

Referring now to FIGS. 2A and 2B, the exemplary data processing method 200 execute using security plug-in 40 of sending node 20. Security plug-in 40 communicates with a network filter driver 220, and may include a transport hook driver 210, a plugin driver 230, a service 240, an application profile 250, process table 23 (including process tree 24) and flow table 25. Network filter driver 220 may be a multi-platform driver and may provide information to security plug-in 40.

Network filter driver 220 and transport hook driver 210 may be used to associate each packet sent external to sending node 20 with a specific application context running on sending node 60.

Transport hook driver 210 may monitor for application executable images (e.g., files) being loaded into processing space from a storage media and may provide an image load indication to plugin driver 230 when an executable image has been loaded. Transport hook driver 210 may also monitor for a process start or a process stop indication, when a process identifier is created or is deleted by the operating system, and may provide a process start indication or a process stop indication to plugin driver 230 when a process, respectively, is started or stopped. Transport hook driver 210 may further monitor for when the loaded image starts to access network 50, and may provide a flow start indication to plugin driver 230 when the executable image is accessing network 50.

Transport hook driver 210 may provide: (1) a process identifier (PID), image path and name information, as an image load indication; (2) the process identifier and a process start epoch or a process stop epoch, as a process start indication or a process stop indication, respectively; and (3) the process identifier and process name, as a flow start indication.

When plugin driver 230 receives the image load indication that an image is loaded, plugin driver 230 may provide service 240 with the process identifier corresponding to the loaded image. Service 240 may fetch (retrieve) using the process identifier a sequence of parent processes of the process corresponding to the loaded image from process tree 24. That is, a sequence of parent processes (parent, grandparent and great-grandparent, among others) associated with the currently executed process is retrieved by service 240. Service 240 may use the process identifiers of the currently executing process and those of the sequence (chain) of parent processes in one or more calls to sending node's operating system process management Application Program Interface (API) to determine the files that invoked the currently executing process and its parent processes. Services 240 may receive information from the operating system process management API regarding the file names that generated the currently executing process and its parent processes.

In certain exemplary embodiments, services may retrieve additional information include: (1) the actual files; (2) the application names; and (3) file attributes such as file size, file date and time. This information and possibly other information derived from the retrieved information (e.g., a file digest) associated with the files generating the currently executing process are matched by service 240 to information stored or temporarily cached in application profile 250. If a match occurs between the information (e.g., application name and/or file digest) of the file generating the currently executing process and a record in application profile 250 and each of the parent processes in the sequence also match a record in application profile 250, an application identifier associated with the particular record in application profile 250 is sent to service 240. That is, the currently executing process and its parents are validated as corresponding to registered applications.

Although the matching process in application profile 250 is described as including the currently executing process and each of its parent processing in the sequence, it is possible to only validate the currently executing process or to validate the currently executing process and a portion of its parent processes.

If a match occurs, service 240 may send the matched application identifier to plugin driver 230. Plugin driver 230 may send an add indication to process table 23. The add indication may include: (1) the process identifier corresponding to the currently executing process received from transport hook driver 210; (2) the image name associated with the currently executing process received from transport hook driver 210; and (3) the application identifier matched to the process identifier received via services 240 from application profile 250.

When a currently executing process is stopped, transport hook driver 210 may send a process stop indication to plugin driver 230. Plugin driver 230 may process the process stop indication, as a termination, and may send a termination (delete) indication to process table 23. The termination (delete) indication may include the process identifier of the process that is stopped. Process table 23 may delete the record including the process identifier of the process that is stopped. That is, process table 23 and/or process tree 24 may include each of the processes currently executing on sending node 20, and may delete records associated with processes as the processes are terminated.

In certain exemplary embodiments, process tree 24 may store process information (e.g., process identifiers and/or other identification information associated with the process identifiers, such as hash values) as a tree structure or a set of linked lists. When requested by plugin driver 230 process table 23 may provide an application identifier associated with a process, for example, using a particular process identifier.

Plugin driver 230, after receiving the flow start indication of a currently executing process, which indicates the start of a packet flow on network 50, from transport hook driver 210, may send a create flow context to flow table 25. The created flow context may include: (1) a flow identifier; and (2) a corresponding application identifier received from service 240. The flow context may be indexed by flow identifier. Flow table 25 may store the flow identifier and the corresponding application identifier received from plugin driver 230. Flow table 25 may send to plugin driver 230 a plugin context including a flow context handle. Plugin driver 230 may issue a find request to flow table 25 using the plugin context and flow table 25 may send a flow context, in response, to plugin driver 230. The flow context may include an application identifier to be retrieved by plugin driver 230. That is, flow table 25 may maintain persistent records of the application identifiers corresponding to particular currently executing processes creating packet flows while the particular currently executing processes continue to create those packet flows.

Plugin driver 230 may send monitor flow requests using its plugin context to network filter driver 220. Network filter driver 220 may send a flow stop indication to plugin driver 230 using the plugin context.

The plugin driver may insert an application identifier associated with a packet flow in flow table 25 in each outgoing packet that corresponds to the particular packet flow. The outgoing packets may be sent via network filter driver 220 from sending node 20, for example, to resource 95 secured by security node. 60.

Packets which do not correspond to any flow may be blocked (prevented) by plugin driver 230 from having an application identifier inserted therein. Such packets may be sent via network filter driver 220 over network 50. The management of access, priority and bandwidth for particular packet flows may be controlled by security (policy) rules enforced in security node 60 (e.g., a policy enforcement point).

A validated application identifier may be used by security node 60: (1) to grant or deny access to resource 95 based on configured policies; (2) to allocate asymmetric bandwidth based on the policies (i.e., to allocate particular channels or frequencies or time slots, for example, based on security tag information; (3) to mark packets with IP Cost of Service/Type of Service (COS/TOS) or Diff-Server Code Point (DSCP) based on configured such policies. The marking of packets and the configuration of policies may be based on the validated application identifier alone or in combination with other attributes in a security tag. For example, a security tag may include a control field, a random number, an opaque client identifier, the application identifier, a TCP sequence number and a digital signature.

In certain exemplary embodiments, the control field may include a release version indicating the version of security tag included in each datagram, a length indicator which indicates the length of the security tag, the key number, the length scale indicating the length of the secret key in bytes, a flag indicating whether the TCP sequence number is included in the security tag, another flag indicating whether the entire payload or a partial payload is included in the security tag and the gateway software instance.

A random number of the same byte length as the client identifier may be exclusively ORed (XOR) with the client identifier to produce the opaque client identifier. A random number of the same byte length as the application identifier may be exclusively ORed with the application identifier to produce an opaque application identifier. The random numbers, opaque application identifier and client identifier may be embedded in the security tag. By obfuscating the client identifier and/or application identifier, security of the embedded security tag may be improved.

Although the opaque identifiers are illustrated as generated by an XOR process, it is contemplated that many other obfuscation techniques may be used as long as the original identifiers can be decoded. For example the random number may be added to or subtracted from the client identifier and/or the application identifier.

A digital signature may be generated, for example, from a hash function or other cryptographic algorithm (include secure hash algorithms (SHA) such as SHA-0, SHA-1, SHA-224, SHA-256, SHA-384, SHA-512 or Message-Digest algorithm MD5).

In certain exemplary embodiments, the digital signature may be based on a negotiated secret key, a random number, the opaque client identifier, the control field, the application identifier, the TCP sequence and/or the payload of the datagram.

Network filter driver 220 may monitor for the stoppage of each flow stored in flow table 25, and may provide a flow stop indication that packets corresponding to a particular packet flow having a flow identifier stored in flow table 25 have stopped.

As illustrated in FIG. 2B, when packets are flowing on network 50 from a particular currently executed process associated with a process identifier, a flow start indication may be provided by transport driver hook 210. The flow start indication may include the process identifier and a call may be made to the process management API to receive the corresponding file identifier associated with the process currently executing. Services 240 using information stored in process tree 24 may find the parent process identifiers of the current process identifier. That is, process tree 24 may store a sequence of process identifiers from the process identifier corresponding to the currently executed process to the root process identifier or some portion of this sequence of process identifiers (e.g., $PID_N, PID_{N-1}, \ldots PID_1, PID_0$). This process identifier information may be used to verify that a registered application is associated with each of the process identifiers in the chain (sequence) $PID_N, PID_{N-1}, \ldots PID_1, PID_0$. The validation for each of the parent processes is the same as for the currently executing process. If each of the process identifiers is associated with a registered application based on a match between the file generating the process identifier and the application profile 250, plugin driver 230 may insert application identifiers into packets associated with the particular packet flow corresponding to the registered application. Alternatively, plugin driver 230 may prevent (block) such application identifiers from being inserted into outgoing packets if one or more of the process identifiers is not associated with a registered application (e.g., may be associated with a rogue application).

Figure 2C:
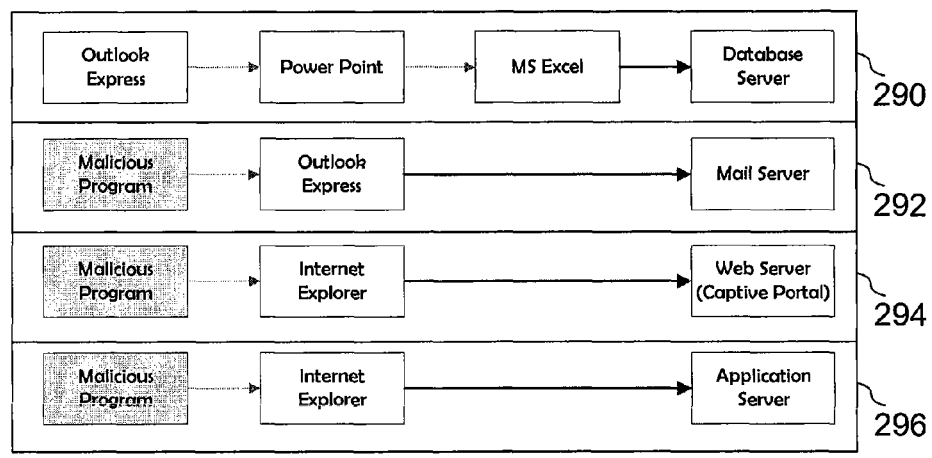
FIG. 2C is a block diagram illustrating examples of the data processing method of FIG. 2B.

FIG. 2C is a block diagram illustrating examples of the data processing method of FIG. 2B.

Now referring to FIG. 2C, examples 290, 292, 294 296 show different programs (executable files) which invoke processes. For example, block 290 shows an Outlook Express application that calls a PowerPoint application which, in turn, calls a Microsoft Excel application on sending node 20. The Microsoft Excel application may call a Database Server application on resource 95. That is, Outlook Express, PowerPoint and Microsoft Excel may be provided in sending node 20, while the Database Server application may be located on secure sub-network 90 and may be protected by security node 60. Because Outlook Express, PowerPoint and Microsoft Excel are registered applications (registered in registration unit 65 of security node 60), each of these applications may be validated by program processor 26 in sending node 20. That is, because each of the parent process identifiers associated with the files invoking Outlook Express and PowerPoint correspond to a registered application and the process identifier associated with the current process (Microsoft Excel) also corresponds to a registered application, program processor 26 may insert the application identifier corresponding to the Microsoft Excel application in information sent to the Database Server via security node 60.

Security node 60 receiving packets having inserted application identifiers associated with Microsoft Excel, may validate that each packet received is authorized based on the application identifier and/or other information of the security tag embedded in each packet and may determine whether to block the packet from its destination (e.g., Database Server) or to establish a proper priority/bandwidth for the packetized communication.

In block 292, 294 and 296, because malicious programs are not registered in registration unit 65 or process tree 24, program processor 26 may block insertion of an application identifier into packets destined for the Mail Servicer, Web Server and Application Server, respectively. That is, when the file associated with the parent process identifier of each malicious program is checked against records in application profile 250, no application identifiers match. In such a case, program processor 26 of sending node 20 may not insert an application identifier into packets flowing from Outlook Express in block 292 and Internet Explorer in blocks 294 and 296. Security node 60 when receiving such packets may prevent the packets from being sent to Mail Server in block 292, Web Server in block 294 and Application Server in block 296 based on security rules internally stored or received from a policy server. Such rules may allow the packets to be sent to protected resources or may block such packets from these resources.

FIG. 3 is a flow chart illustrating a method 300 of managing packet flow in accordance with yet another exemplary embodiment of the invention.

Referring to FIG. 3, method 300 may include, at optional block 310, security node 60 establishing a list of registered applications and unique application identifiers associated therewith in process table 22. At optional block 320, sending unit 64 of security node 60 may securely send using a protected communication channel and/or using an encryption technique (e.g., private-key encryption or public-key encryption, for example of a session key, among others) to sending node 20 the list of registered applications and their associated application identifiers.

At block 330, receiving unit 62 of security node 60 may receive packets destined for one or more resources 95. These packets may each include an inserted application identifier identifying a registered application. At block 340, packet processor 63 of security node 60 may determine the inserted application identifier for each of the packets received by receiving unit 62. At block 350, packet processor 63 may manage the packet flow from security node 60 based at least in part on the inserted application identifier of the packet received by receiving unit 62.

The determination at block 340 may include: (1) scanning for the embedded security tag in each of the packets received by security node 60; and (2) extracting the inserted application and user identifiers from the scanned security tags of the packets received by security node 60. The management at block 350 may include: (1) determining, for each received packet, whether the user associated with the inserted user identifier is authorized to use a specific application or a specific resource based on the set of security rules. If the user is authorized to use the specific application and the specific resource, packet processor 63 may determine at least one of a priority or a bandwidth for flow of the respective packets to the specific resource. Alternatively, if the user is non-authorized to use the specific application or the specific resource, packet processor 63 may prevent (block) the flow of the packets associated with the non-authorized user to one or more resources 95 or the specific resource.

In certain exemplary embodiments, receiving unit 29 of sending node 20 may receive a list of registered application and their unique application identifiers and program processor 26 may insert the application identifier identifying the registered application into packets to be sent from sending node 20 to one or more resources 95. Sending unit 28 of sending node 20 may send the packets destined for one or more resources 95 via security node 60.

Program processor 26 may insert the application identifier into each packet by: (1) embedding at least the application identifier and a user identifier in a security tag; and (2) inserting the security tag into each of the packets sent by sending node 60, as an in-band metadata tag (e.g., a security tag sent as part of the packet and including metadata to establish, for example, the user requesting a resource and the registered application associated with the particular packet, among others). Program processor 26 may selectively insert a respective application identifier into each packet: (1) associated with an application in the white list of registered applications; and (2) destined for one of the protected resources (e.g., one or more resources 95). Alternatively, program processor 26 may prevent (or block) any application identifiers from being inserted into packets that are associated with an application not in the white list of registered applications or that are not destined for a protected resource.

FIG. 4 is a flow chart illustrating a method of inserting an application identifier into respective packets from a sending node destined for a resource on a network in accordance with yet another exemplary embodiment of the invention.

Referring to FIG. 4, method 400 may include, at block 410, electronic database 22 that may store information identifying registered applications including associated application identifiers. At block 420, program processor 26 may determine each currently executing process and at least a process identifier corresponding to each currently executing process.

At block 430, program processor 26 may match, using the electronic database 22, the information identifying registered applications with information associated with the process identifiers of each currently executing process. At block 440, sending node 20 may determine whether there is a match. If a match does not occur at block 440, at block 450, program processor 26 may prevent (may block) the insertion of any application identifier in each packet to be sent by sending node 20 and may end the operation. If a match occurs at block 440, at block 460, program processor 26 may insert the matched application identifier in each packet to authenticate that the registered application corresponding to the matched application identifier is associated with the respective packets.

In certain exemplary embodiments, the insertion of the matched application identifier in each packet may include at least one of: (1) obfuscating the application identifier; or (2) encrypting the application identifier using a session key.

The matching of the information identifying registered applications with the information associated with the process identifiers of each currently executing process may include: (1) determining from the currently executing process a file invoking the currently executing process; and (2) matching characteristics of the file invoking the currently executing process to information identifying registered applications to authenticate the application associated with the currently executing process. The characteristics of the file to be match may include at least one of: (1) a digital digest of the file; (2) a date and time that the file was last edited; (3) a version of the file; and/or (4) publisher information.

FIG. 5 is a flow chart illustrating a method of inserting an application identifier into respective packets in accordance with yet another exemplary embodiment of the invention.

Referring now to FIG. 5, method 500 may include, at block 510, program processor 26 to determine whether a process is attempting network access to one or more resources 95. If a process is not attempting network access to resources 95 secured by the security node 60, the program processor 26 may wait until a process attempts such network access. If a process attempts network access to one or more resources 95 at block 510, at block 520, process table 23 and/or process tree 24 stores information identifying each executed process and a parent process which invoked the executed process. At block 530, program processor 26 may validate that each of the parent processes in a sequence of its parent processes are associated with registered applications in electronic database 22. If each of the parent processes in a sequence of parent processes is validated at block 530, at block 460, program processor 26 may insert the matched application identifier in each packet to authenticate that the registered application corresponding to the matched application identifier is associated with the respective packets. If any one the parent processes in the sequence of parent processes is not validated at block 530, at block 540, program processor 26 may prevent insertion of any application identifier in the respective packets to be sent by sending node 60.

FIG. 6 is an exemplary packet schema illustrating a position of a security tag in accordance with yet another exemplary embodiment of the invention.

Referring now to FIG. 6, exemplary packet schema 600 may include, for example, seven nested layers. An application layer 670 may be nested inside of a presentation layer 660. Presentation layer 660 may be nested inside of session layer 650. Session layer 650 may be nested inside of transport layer 640. Transport layer 640 may be nested inside of network layer 630. Network layer 630 may be nested inside of data link layer 620. Data link layer 620 may be nested inside of Physical layer 610. Each layer above physical layer 610 may include a header and a trailer. That is: (1) application layer 670 may include an application header 674 and an application trailer 678; (2) presentation layer 660 may include a presentation header 664 and a presentation trailer 668; (3) session layer 650 may include a session header 654 and a session trailer 658; (4) transport layer 640 may include a transport header 644 and a transport trailer 648; (5) network layer 630 may include a network header 634 and a network trailer 638; and (6) data link layer 620 may include a data link header 624 and a data link trailer 628. That is, each of these layers includes a header (which includes information used for management of the packet and a trailer that marks the end of the particular layers data). One of skill understands from the discussion herein that each layer generally performs a different function and that to inspect the application layer data, the packet is generally inspected by each of the other layers 610, 620, 630, 640, 650, 660 prior to having the application layer data inspected. In certain exemplary embodiments, the security tag may be included in header 634 or trailer 638 of network layer 630. Alternatively, it is also possible to include the security tag in headers 644, 654, 664 or 674 or trailers 648, 658, 668 or 678 of layers 640, 650, 660 or 670, as well as within the data portion of the packet.

In various exemplary embodiments, the application identifier may be inserted in each packet such that a determination of whether the application identifier matches a registered application may occur at a layer below application layer 670.

Although the invention has been described in terms of sending and receiving node, it is contemplated that it may be implemented in software on microprocessors/computers (not shown). In various embodiments, one or more of the functions of the various components may be implemented in software that controls a computer. This software may be embodied in a computer readable storage medium, for example, a magnetic or optical disk, or a memory-card.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of controlling packet flow, comprising:
receiving, from a sending node by a packet processor of a security node, packets destined for one or more resources, the sending node inserting an application identifier into a respective one of the packets responsive to determining that the respective one of the packets is sent from a first application registered with the security node and that the first registered application is invoked for execution by a second application registered with the security node;
determining, by the packet processor for each of the received packets, whether a respective application identifier has been inserted by the sending node; and
controlling, by the packet processor for the received packets determined to have an inserted application identifier, a packet flow of the corresponding packets being sent from the security node by establishing one or more of a priority or a bandwidth of the corresponding packets to the one or more resources.

2. The method of claim 1, wherein the determining of the inserted application identifier occurs in the security node in an Open Systems Interconnect (OSI) layer below an application layer.

3. The method of claim 1, wherein the determining of the inserted application identifier occurs in a network layer.

4. The method of claim 1, further comprising:
establishing, by the security node, a list of registered applications and unique application identifiers associated therewith; and
securely sending, by the security node to the sending node, the list of registered applications and the associated unique application identifiers.

5. The method of claim 1, further comprising:
inserting, by a program processor of the sending node, the application identifier identifying the registered application into packets to be sent from sending node; and
sending the packets destined for the one or more resources via the security node.

6. The method of claim 1, wherein the inserting of the application identifier includes:
embedding at least the application identifier and a user identifier in a security tag; and
inserting the security tag into each of the packets sent by the sending node, as an in-band metadata tag.

7. The method of claim 6, wherein the determining of the inserted application identifier for each of the respective packets received by the security node includes:
scanning for the embedded security tag in each of the packets received by the security node; and
extracting the inserted application and user identifiers from the scanned security tags of the packets received by the security node.

8. The method of claim 1, wherein the inserting of the application identifier into packets to be sent from the sending node includes:
selectively inserting a respective application identifier into each packet: (1) associated with an application in a list of registered applications; and (2) destined for one of the one or more resources such that application identifiers are prevented from being inserted into packets that are associated with an application not in the list of registered applications or that are not destined for one of the one or more resources.

9. The method of claim 1, wherein the adjustment of one or more of a priority or a bandwidth of the corresponding packets to the resource is based on at least the application identifier in the corresponding packets.

10. The method of claim 1, further comprising:
blocking, by the security node, the flow of packets without an inserted application identifier to the one or more resources.

11. The method of claim 1, further comprising:
generating audit logs from the received packets that include at least information to watermark an application associated with the received packets.

12. A security node for managing packet flow between a sending node and one or more resources on a network, comprising:
a registration unit configured for registering applications that are authorized to access the one or more resources on the network; and
a packet processor comprising circuitry configured for:
receiving, from the sending node, packets destined for the one or more resources, the sending node inserting an application identifier into a respective one of the packets responsive to determining that the respective one of the packets is sent from a first application registered with the security node and that the first registered application is invoked for execution by a second application registered with the security node;
determining, for each of the received packets, whether a respective application identifier has been inserted by the sending node;
controlling, for the received packets determined to have an inserted application identifier, a packet flow of the packets being sent from the security node by establishing one or more of a priority or a bandwidth of the corresponding packets to the one or more resources.

13. The security node of claim 12, further comprising:
an event logger configured for generating audit logs from the received packets that includes at least information to watermark an application associated with the received packets.

14. The security node of claim 12, wherein the packet processor is configured to determine presence of the respective application identifier in an Open Systems Interconnect (OSI) layer below an application layer.

15. The security node of claim 12, wherein the packet processor is configured to determine presence of the respective application identifier in a network layer.

16. The security node of claim 12, wherein the packet processor is configured to establish a list of registered applications and unique application identifiers associated therewith, and to securely send, to the sending node, the list of registered applications and the associated unique application identifiers.

17. The security node of claim 12, wherein a program processor of the sending node inserts the application identifier identifying the registered application into packets to be sent from sending node, and sends the packets destined for the one or more resources via the security node.

18. The security node of claim 17, wherein the inserting of the application identifier includes:
embedding at least the application identifier and a user identifier in a security tag; and
inserting the security tag into each of the packets sent by the sending node, as an in-band metadata tag.

19. The security node of claim 18, wherein the packet processor is configured to determine a presence of an application identifier in each of the respective packets received by the security node by:
scanning for the embedded security tag in each of the packets received by the security node; and
extracting the inserted application from the scanned security tags of the packets received by the security node.

20. The security node of claim 17, wherein the inserting of the application identifier into packets to be sent from the sending node includes:
selectively inserting a respective application identifier into each packet: (1) associated with an application in a list of registered applications; and (2) destined for one of the one or more resources such that application identifiers are prevented from being inserted into packets that are associated with an application not in the list of registered applications or that are not destined for one of the one or more resources.

* * * * *